United States Patent
Morinaga et al.

(10) Patent No.: US 7,330,324 B2
(45) Date of Patent: Feb. 12, 2008

(54) MAGNETIC DISK DRIVE HAVING A FUNCTION FOR USING A THERMAL PROTRUSION AMOUNT FOR FLYING HEIGHT MANAGEMENT AND AN INSPECTION DEVICE HAVING SUCH A FUNCTION

(75) Inventors: Akira Morinaga, Kanagawa (JP); Yoji Maruyama, Saitama (JP); Hiroshi Ide, Tokyo (JP); Norifumi Miyamoto, Kanagawa (JP)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 0 days.

(21) Appl. No.: 10/890,073

(22) Filed: Jul. 12, 2004

(65) Prior Publication Data
US 2005/0046985 A1    Mar. 3, 2005

(30) Foreign Application Priority Data
Aug. 28, 2003    (JP) ............................... 2003-303828

(51) Int. Cl.
*G11B 5/02*    (2006.01)
(52) U.S. Cl. .......................... 360/59; 360/75; 360/126; 360/128
(58) Field of Classification Search ...................... None
See application file for complete search history.

(56) References Cited
U.S. PATENT DOCUMENTS

| | | | |
|---|---|---|---|
| 4,414,589 A * | 11/1983 | Oliver et al. ................. 360/31 |
| 5,168,413 A * | 12/1992 | Coker et al. ................. 360/137 |
| 5,527,110 A | 6/1996 | Wickramasinghe et al. |
| 5,594,595 A * | 1/1997 | Zhu ............................. 360/31 |
| 5,810,477 A * | 9/1998 | Abraham et al. ........... 374/141 |
| 5,831,781 A | 11/1998 | Okamura |
| 5,909,330 A | 6/1999 | Metz et al. |
| 5,991,113 A * | 11/1999 | Meyer et al. ................. 360/75 |
| 6,119,261 A | 9/2000 | Dang et al. |
| 6,191,901 B1 | 2/2001 | Metz et al. |
| 6,195,219 B1 * | 2/2001 | Smith .......................... 360/66 |

(Continued)

FOREIGN PATENT DOCUMENTS

EP    294 761 A1    12/1988
EP    783 168 A2    7/1997

*Primary Examiner*—Andrea Wellington
*Assistant Examiner*—Dismery Mercedes
(74) *Attorney, Agent, or Firm*—Townsend and Townsend and Crew LLP; Rambod Nader

(57) ABSTRACT

A write head's material having a great thermal expansion coefficient expands due to Joule heat resulting from a write current and a temperature rise dependent on high-frequency core loss, thereby causing the head's flying surface to protrude toward a magnetic disk. This phenomenon is called TPR (thermal protrusion). It is essential that the flying height be accurately determined and managed in consideration of TPR. A magnetic disk drive for actual use or a magnetic disk drive that is in a testing process but similar to the one for actual use is used to measure TPR amount changes resulting from a write operation, store the resulting measured data in a memory or on the magnetic disk, and perform flying height management with the stored measured data. Further, flying height management is performed as needed in conjunction with a SMART function. The present invention makes it possible to perform high-reliability flying height management.

19 Claims, 8 Drawing Sheets

U.S. PATENT DOCUMENTS

| | | |
|---|---|---|
| 6,229,665 B1 | 5/2001 | Metz et al. |
| 6,239,936 B1 * | 5/2001 | Abraham et al. ............. 360/75 |
| 6,366,416 B1 | 4/2002 | Poon et al. |
| 6,459,539 B1 | 10/2002 | Metz et al. |
| 6,501,611 B1 * | 12/2002 | Li ............................... 360/53 |
| 6,665,134 B2 * | 12/2003 | Ottesen et al. ................ 360/53 |
| 6,741,524 B2 * | 5/2004 | Ichihara et al. .......... 369/13.01 |
| 6,947,246 B2 * | 9/2005 | Lille ........................... 360/75 |
| 6,950,266 B1 * | 9/2005 | McCaslin et al. ............. 360/75 |
| 6,950,267 B1 * | 9/2005 | Liu et al. ...................... 360/75 |
| 6,999,256 B2 * | 2/2006 | Kim et al. .................... 360/31 |
| 7,009,800 B2 * | 3/2006 | Yang ........................... 360/75 |
| 7,027,263 B2 * | 4/2006 | Ottesen et al. ........... 360/234.4 |
| 7,068,457 B2 * | 6/2006 | Riddering et al. ............. 360/75 |
| 7,221,529 B2 * | 5/2007 | Otsuki et al. ................. 360/46 |

\* cited by examiner

FIG.2
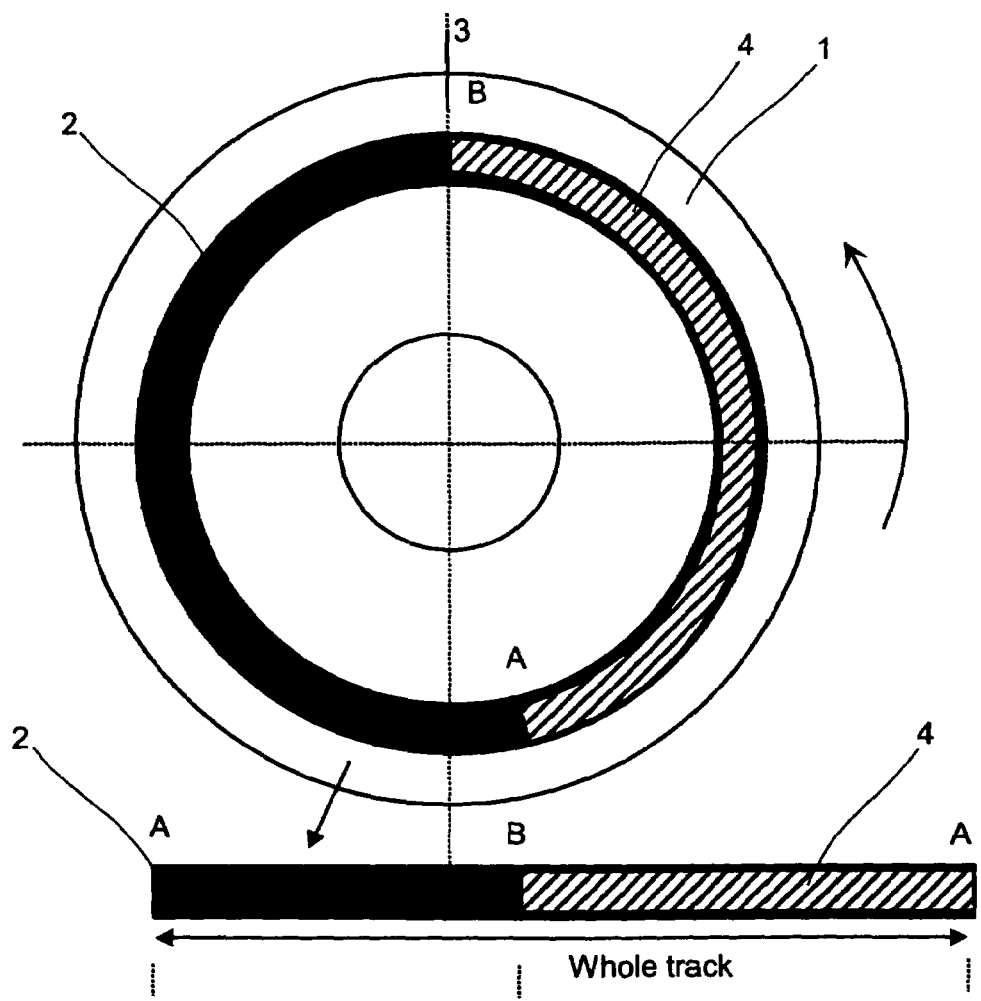
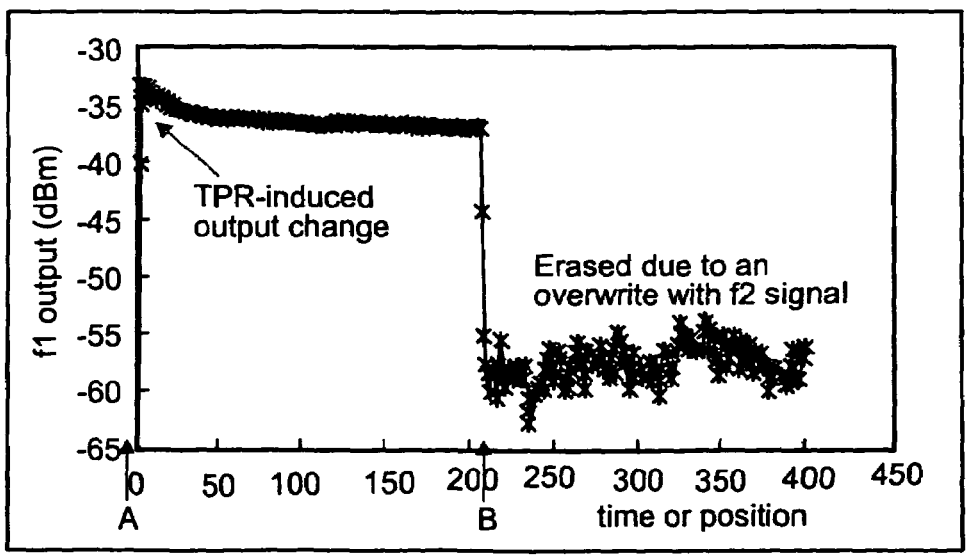

MAGNETIC DISK DRIVE HAVING A FUNCTION FOR USING A THERMAL PROTRUSION AMOUNT FOR FLYING HEIGHT MANAGEMENT AND AN INSPECTION DEVICE HAVING SUCH A FUNCTION

BACKGROUND OF THE INVENTION

The present invention relates to a magnetic disk drive that is capable of performing flying height management in consideration of a thermal protrusion (head flying surface protrusion toward a medium) caused by a write operation, an inspection device that is capable of measuring the flying height in consideration of a thermal protrusion caused by a write operation, and a method for measuring a thermal protrusion caused by a write operation.

The magnetic disk drive is a device that is capable of recording a large amount of data and essential to the present-day, advanced information society. It is demanded that the magnetic disk drive be capable of consistently reading data and writing data (performing read/write operations). The magnetic disk drive comprises a magnetic recording medium (magnetic disk) on which data is recorded, a magnetic head for reading/writing recordings, a voice coil motor for moving the magnetic head, and other circuits. The magnetic head comprises a write head for writing data and a read head for reading data recorded on the magnetic disk. The magnetic head performs a read/write operation while flying over the magnetic disk. A technology for generally improving the reliability of the magnetic disk drive by performing flying height management is disclosed by Hiroshi Okamura, "Hard disk drive structure and applications," CQ Publishing Co. Ltd., May 1, 2002, pp. 153-155. The SMART (Self Monitoring Analysis and Reporting Technology) function described in Okamura includes a flying height management function that measures the output resolution. This function can be performed to determine stationary flying height changes arising out of the changes in the atmospheric pressure and ambient temperature. In reality, the write head structure, slider flying surface shape, and suspension are designed so that the stationary flying height is within a certain specification.

Meanwhile, the magnetic head needs to have excellent read/write characteristics in order to provide a high-performance magnetic disk drive. For magnetic head evaluation and selection, an inspection device (read/write tester and spin stand) having the same read/write function as the magnetic disk drive and exhibiting high positioning accuracy is used.

BRIEF SUMMARY OF THE INVENTION

In the magnetic disk drive, to control the flying height of the magnetic head as measured from a medium is extremely important from the viewpoint of assuring adequate read/write performance and avoiding data loss due to magnetic head-to-media contact and other problems. Recently, it is observed that the write head's material having a great thermal expansion coefficient expands due to Joule heat resulting from a write current and a temperature rise dependent on high-frequency core loss, thereby causing the head's flying surface to protrude toward the magnetic disk. This phenomenon is called TPR (thermal protrusion). If this phenomenon occurs, a problem arises because the flying height is temporarily smaller than the design value during a write operation only. To increase the recording density of the magnetic disk drive, it is necessary to minimize the flying height of the magnetic head. It is therefore essential that the flying height be accurately determined and managed in consideration of the influence of TPR resulting from a write operation. This write-operation-induced TPR is a phenomenon that occurs during a write operation and cannot be controlled by the SMART function that manages stationary flying height changes.

To solve the above problems, a magnetic disk drive for actual use or a magnetic disk drive that is in a testing process but similar to the one for actual use is used to measure TPR amount changes resulting from a write operation, store the resulting measured data in the memory or on the magnetic disk, and perform flying height management with the stored measured data. Further, flying height management is performed as needed in conjunction with the SMART function. When the TPR amount is used for flying height management, it is possible to consider a state where the flying height is smaller than the design value during a write operation. As a result, highly reliable, flying height management can be performed under more stringent conditions. In addition, a read/write tester that is capable of measuring the TPR amount described above is also proposed.

When flying height management is performed in consideration of thermal protrusion (TPR) amount, a high-reliability magnetic disk drive can be provided by avoiding magnetic head-to-magnetic disk contact and crash. Further, when the flying height measurement function disclosed by the present invention is performed with a read/write tester or inspection device, the amount of thermal protrusion arising out of a write operation can be accurately measured.

BRIEF DESCRIPTION OF THE DRAWINGS

FIG. 2 illustrates an example of a method for measuring the amount of write-induced thermal protrusion (TPR) in the first, second, and third embodiments of the present invention.

DETAILED DESCRIPTION OF THE INVENTION

Embodiments of the present invention will now be described with reference to the accompanying drawings.

Figure 1:
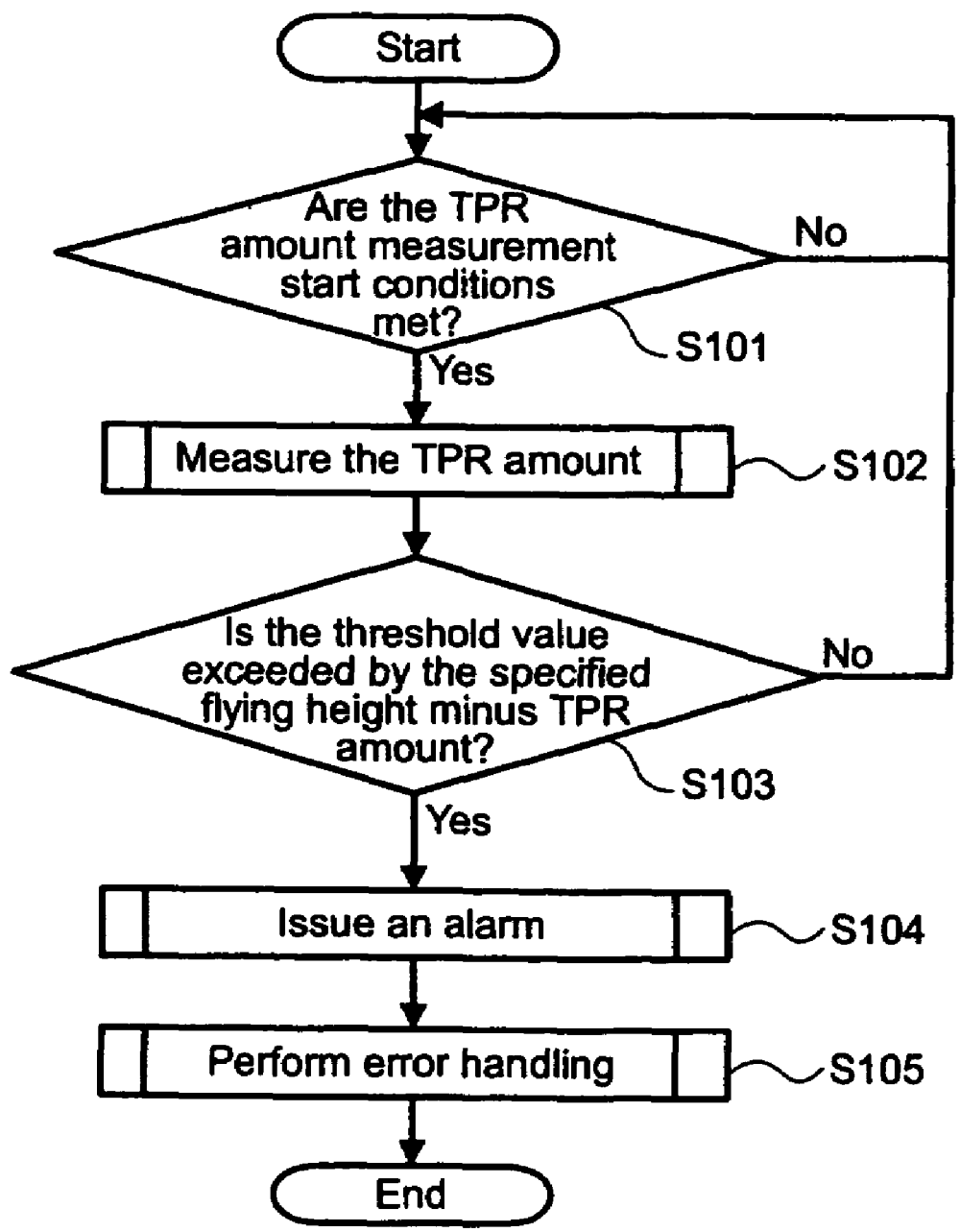
FIG. 1 is a flowchart illustrating a series of processing steps that are performed by a first embodiment of the present invention.

FIG. 1 is a flowchart that illustrates a series of operations performed by a magnetic disk drive according to one embodiment of the present invention. The magnetic disk drive has a TPR amount measurement function and measures the TPR amount with specific timing. The TPR amount measurement function first checks whether the conditions for TPR amount measurement start are met (step S101). The measurement starts upon magnetic disk drive turn-on, upon magnetic head loading over a magnetic disk, or at specific time intervals. When the conditions are met, the TPR amount measurement sequence starts (step S102). The minimum flying height, which takes into account the amount of TPR arising out of a write, is obtained by subtracting the TPR amount (positive value) acquired by the TPR amount measurement function from the flying height setting. A threshold value is defined and used to check whether it is exceeded by the minimum flying height (step S103). If the minimum flying height (which is equal to the specified flying height minus the TPR amount) is smaller than the threshold value (the answer to the question is "Yes"), an alarm is issued because it is concluded that a danger exists (step S104). If, on the other hand, the minimum flying height is greater than the threshold value (the answer to the question is "No"), the TPR amount is measured again at the next time step. When the minimum flying height is smaller than threshold value, the magnetic disk can issue an alarm to the user directly or via a host (step S105). Since the TPR amount is proportional to the write current, the write current can be adjusted to decrease the TPR amount. Further, the TPR amount increases with an increase in the amount of write current overshoot. Therefore, the amount of overshoot can be adjusted so as to decrease the TPR amount. Furthermore, the head can be unloaded in order to avoid a failure or data loss, which may result from magnetic-head-to-magnetic disk contact.

The action of the TPR amount measurement function will now be described. The TPR amount can be measured within the magnetic disk as described below.

Figure 3:
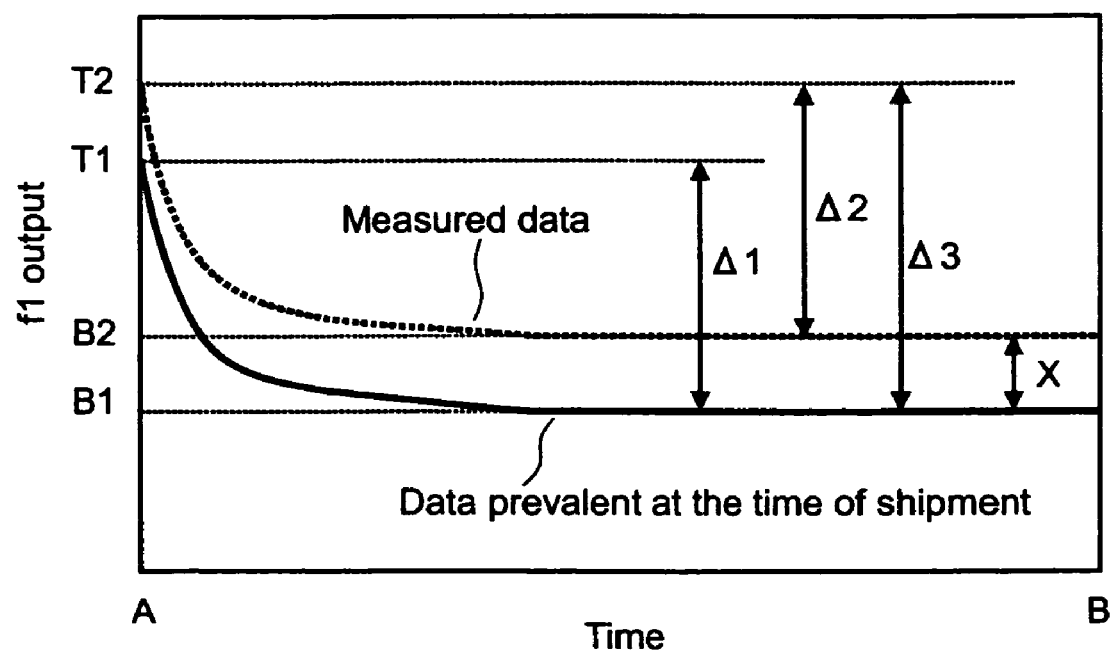
FIG. 3 illustrates an example of a reference signal, which changes with time immediately after an excitation signal is written.

FIG. 2 schematically illustrates the positional relationship between a magnetic disk and a recorded track. A thick curve in FIG. 3 is an example of a measured output, which changes with time. As indicated by a portion filled in black in FIG. 2, a reference track 2, which is written with a write current having a specific frequency of f1, is first prepared circumferentially at a radial position of a certain area on a magnetic disk 1 by a write operation (first write operation). For measurement accuracy enhancement, it is preferred that the frequency f1 of the write current be high. However, if the frequency is too high, the output is likely be affected by noise. In the present embodiment, a track 2 of the magnetic disk 1 is written into with the frequency f1 set to 400 MHz. When the write current having a single frequency of f1 flows to a write head in this manner, a single pattern signal (a signal in a state where magnets having substantially the same lengths would be aligned) is recorded in the reference track 2 on the magnetic disk 1. To invoke TPR on the flying surface side of a magnetic head (not shown), a write operation (second write operation) is performed by an excitation signal having a specific write current frequency f2 as indicated, for instance, by a shaded area 4, which is between position B and position A of an index signal 3, and then a read operation is performed to continuously capture f1 signal changes (replay output changes) occurring immediately after position A. A graph in the lower part of FIG. 2 shows f1 signal replay output changes. The X-axis of this graph indicates f1 output measurement points (the points are spaced at 20 μsec intervals), whereas the Y-axis indicates the f1 signal replay output (dBm). At position A of the reference track 2, the flying height is reduced by TPR so that the f1 output is increased to approximately −33 dBm. When the time elapses with the magnetic disk 1 rotating, the magnetic head device temperature lowers. When the magnetic head reaches position B, TPR, which arises out of write-current-induced Joule heat and high-frequency core loss, reverts to the previous state (equilibrium in which the TPR amount is approximately zero). In the equilibrium, the f1 output is approximately −38 dBm. The frequency f2 should be, for instance, the maximum frequency (HF) that is handled by the magnetic disk drive. In the present embodiment, the f2 signal is overwritten in the reference track 2 with the frequency f2 set to 500 MHz (shaded area 4). The excitation signal f2 may begin at an arbitrary position within a track instead of an index signal position 3. If the read/write offset amount is small, the write operation for the excitation signal f2 needs to be performed only for a specific sector or for a specific period of time so as not to erase the entire f1 signal within the track. When the above measurements are made, it generally takes several hundred microseconds for a varying flying height, which corresponds to TPR arising out of a write operation, to arrive at equilibrium. It is therefore necessary to adjust the f2 write time or sector so that the time required for the head to move from position A to position B is at least long than several hundred microseconds. In the present embodiment, the time interval between positions A and B is set to approximately 4 msec (approximately 210 measurement points). However, the time required for arriving at equilibrium varies, for instance, with the composition of a magnetic head shield layer and magnetic pole. Therefore, an appropriate value can be set variously for all magnetic heads. The time required for invoking TPR, that is, the time required for writing the excitation signal f2 in a track area 4 from position B to position A, may be rendered equal to the time required for the f1 output variation arising out of TPR to arrive at equilibrium because the head device material time constant for cooling is substantially equal to that for heating. In the present embodiment, the heating period (B→A) for invoking TPR differs in length from the cooling period (A→B) for arriving at equilibrium. However, the present invention can be applied to a case where the heating period and cooling period are both equal to or longer than the required length of time.

The reference track 2 may be either a single track or a set of two or more tracks. A reference track 2 in which the f1 signal is to be written may also be provided on both the inside and outside of the reference track 2 in which the f2 signal is to be written (corresponding to the track in the shaded area 4). When the configuration described above is employed, the f1 signal can be positioned on adjacent tracks while the f1 signal is being read. Therefore, the noise generated from the adjacent tracks can be reduced to increase the TPR amount measurement accuracy. Further, since the use of the above configuration also reduces yaw-angle-dependent changes in the output of a head slider, the accuracy of the TPR amount measurement function can be enhanced. When the reference track 2 is provided for both surfaces of the magnetic disk 1 or for a plurality of magnetic disks 1, the reference track 2 is provided for the same cylinders. The use of this configuration makes it possible to simultaneously measure the flying height of all magnetic heads. Alternatively, the reference track 2 may also be provided for a plurality of cylinders.

As described above, the output is great at position A, which is immediately after the end of a write operation, because the flying height is decreased by TPR. Therefore, the write head temperature lowers with time, decreasing the amount of head protrusion. As a result, equilibrium is reached. The amount of change in the flying height can be calculated from the difference between the maximum value of the resulting f1 signal output and the output prevailing in equilibrium. When the maximum output value is V', the prevalent flying height is d', the output and flying height in equilibrium are V and d, respectively, and the wavelength of a signal written on the base is λ, the following equation is obtained:

$$\text{TPR amount} = (d-d') = -\lambda/2\pi ln(V/V') \quad \text{(Equation 1)}$$

In the present embodiment, the TPR amount measurement function uses Equation 1 to calculate the TPR amount for each magnetic head with predetermined timing and uses the calculation results for flying height management.

Figure 4:
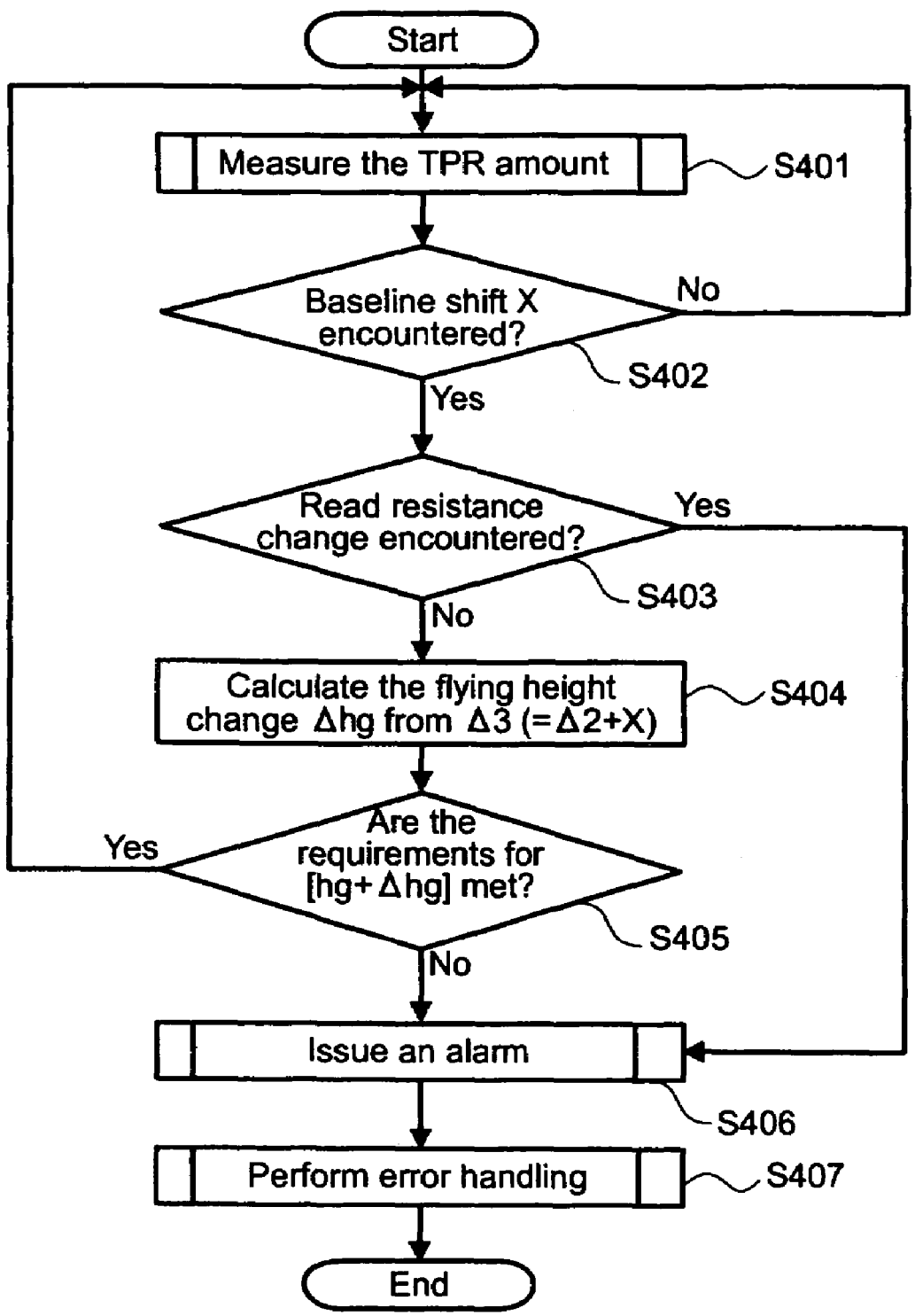
FIG. 4 is a flowchart illustrating a series of processing steps that are performed when a TPR measurement function is provided in a magnetic disk drive in accordance with the first embodiment of the present invention.

FIG. 4 is a flowchart illustrating the use of the flying height measurement method described above. First of all, the TPR is measured (step S401) to compare the output in equilibrium against the value prevalent in the initial state (which is prevalent at the time of shipment). If any change (baseline shift X shown in FIG. 3, which is described later) is encountered (step S402), the MR resistance monitoring function, which is a part of the SMART function, is performed to check for a change in the read head's resistance (step S403). If the resistance is changed, it is conceivable that the read head is about to become damaged. Therefore, the SMART function issues an alarm (step S406), and the host performs error handling (step S407). If no resistance change occurs, the flying height change measurement process is continuously performed (steps S404 and S405). Head flying height changes will now be described with reference to FIG. 3 while considering the changes with time. The horizontal axis of a graph shown in FIG. 3 represents the time interval between positions A and B or the location, whereas the vertical axis indicates the output of the reference track 2, in which a recording is made with f1. The values T1 and T2 denote the maximum output values prevalent at the time of shipment and at the time of measurement, respectively. The values B1 and B2 denote the output equilibrium values prevalent at the time of shipment and at the time of measurement, respectively. In a measurement process according to the present embodiment, a baseline shift amount X (change with time) arises unlike at the time of product shipment. Δ1 denotes an output change that is dependent on TPR prevalent at the time of shipment. Δ2 denotes an output change that is dependent on TPR prevalent at the time of measurement. Δ3 (=Δ2+baseline shift amount X) denotes an output change that corresponds to the maximum fly change occurring when TPR is taken into account. The Δ3 value is used (Equation 1) to calculate the TPR amount (Δhg). Checkout is then conducted to determine whether the minimum flying height (hg+Δhg), which takes the amount of a write-induced TPR into account, is within the threshold value range (step S405). If a threshold value is exceeded, an alarm signal is issued (step S406).

When the measured/calculated TPR amount (Δhg) is used in conjunction with a flying height measurement provided by the SMART function, flying height management can be performed with increased reliability. The obtained TPR amount is recorded in the memory or on the magnetic disk and used for flying height management. The TPR amount varies with the magnetic head. The TPR amount varies from one magnetic head to another, which are incorporated within the magnetic disk drive. When, for instance, a magnetic head having a great TPR amount is set to permit a fly greater than the minimum permissible flying height of a magnetic head having a small TPR amount, the possibility of magnetic head-to-magnetic disk contact can be reduced to provide increased reliability. When the TPR amounts appropriate for individual magnetic heads are used as described above to perform fly height management while performing the SMART function as needed, it is possible to provide a high-reliability magnetic disk drive in which the loss of data and crash are not likely to occur due to magnetic head-to-magnetic disk contact.

Figure 8:
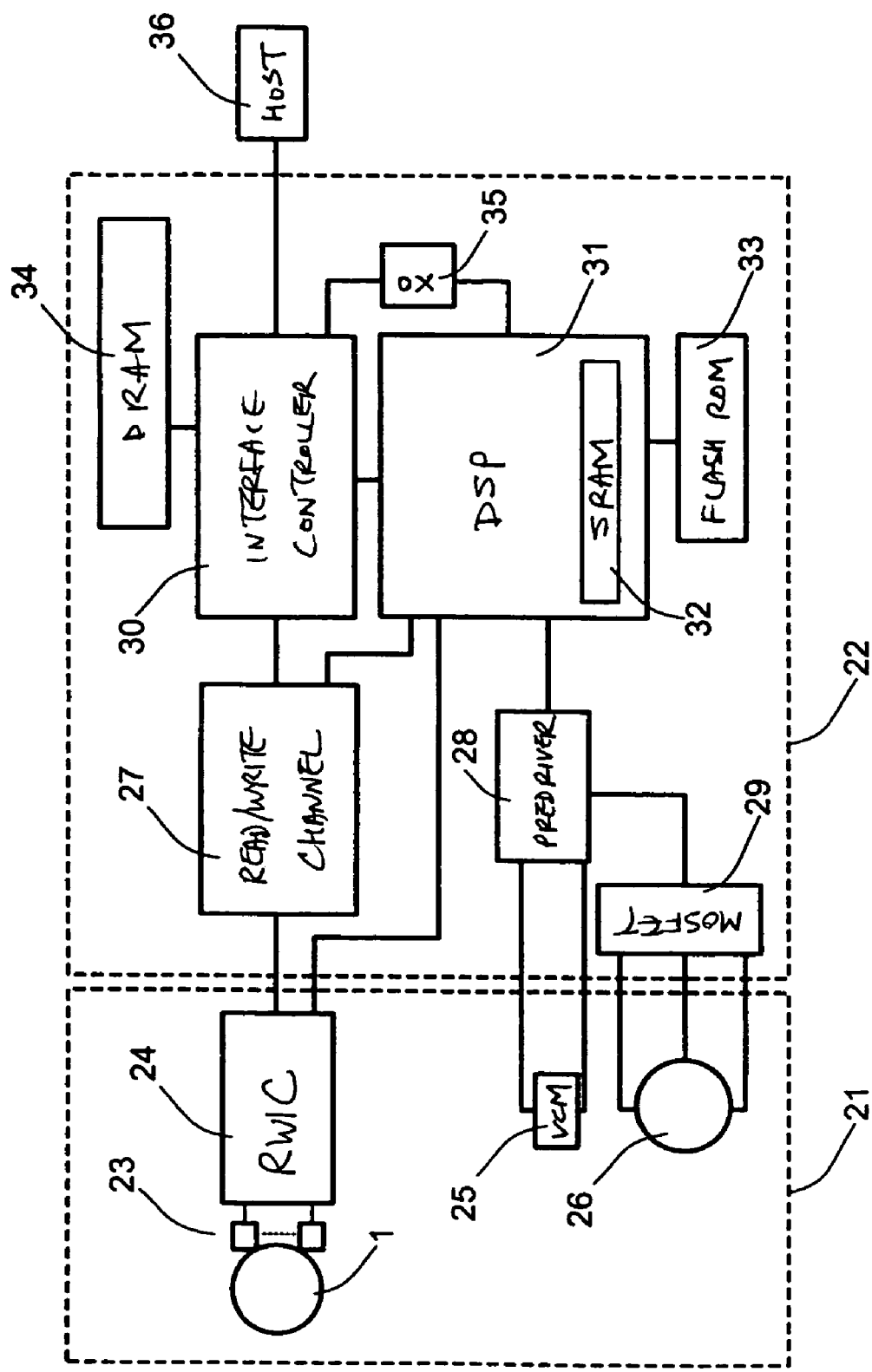
FIG. 8 is a block diagram that briefly illustrates the functionality of a magnetic disk drive.

FIG. 8 is a block diagram that briefly illustrates the functionality of a magnetic disk drive. The magnetic disk dive comprises a head disk assembly (HDA) 21 and a circuit board 22. The HDA 21 comprises a magnetic head 23, a read/write IC (RWIC) 24 connected to the magnetic head, a magnetic disk 1, a spindle motor 26 for rotating the magnetic disk, and a voice coil motor (VCM) 25 for positioning the magnetic head. The spindle motor 26 is controlled by a MOS FET 29 and a predriver 28. The voice coil motor is also controlled by the predriver 28 in a similar manner. Meanwhile, the RWIC 24 exchanges data with a read/write channel 27. A magnetic disk drive control program or a control program for the SMART function or other function is stored in a flash ROM 33 or on the magnetic disk 1. A program that needs to be run at a high speed is temporarily stored in a SRAM 32 on a digital signal processor (DSP) 31 and used upon startup. The magnetic disk drive exchanges user data with a host computer 36 via a SCSI, FCAL, ATA, or other interface controller 30. A DRAM 34 is used as a buffer for such user data exchange. The DSP 31 provides integrated control over a positioning system, read/write system, and interface system. A crystal oscillator (XO) 35 is provided.

The TPR amount measurement program having the TPR amount measurement function according to the present embodiment, the output change Δ1 encountered at the time of shipment, the TPR amount, and other information can be stored in the flash ROM 33 or on the magnetic disk 1. Further, the TPR amount data such as Δ2, Δ3, and X, which are measured within the hard disk drive, and the TPR amount (Δhg) can be temporarily stored in the SRAM 32 on the DSP 31 and used.

Figure 5:
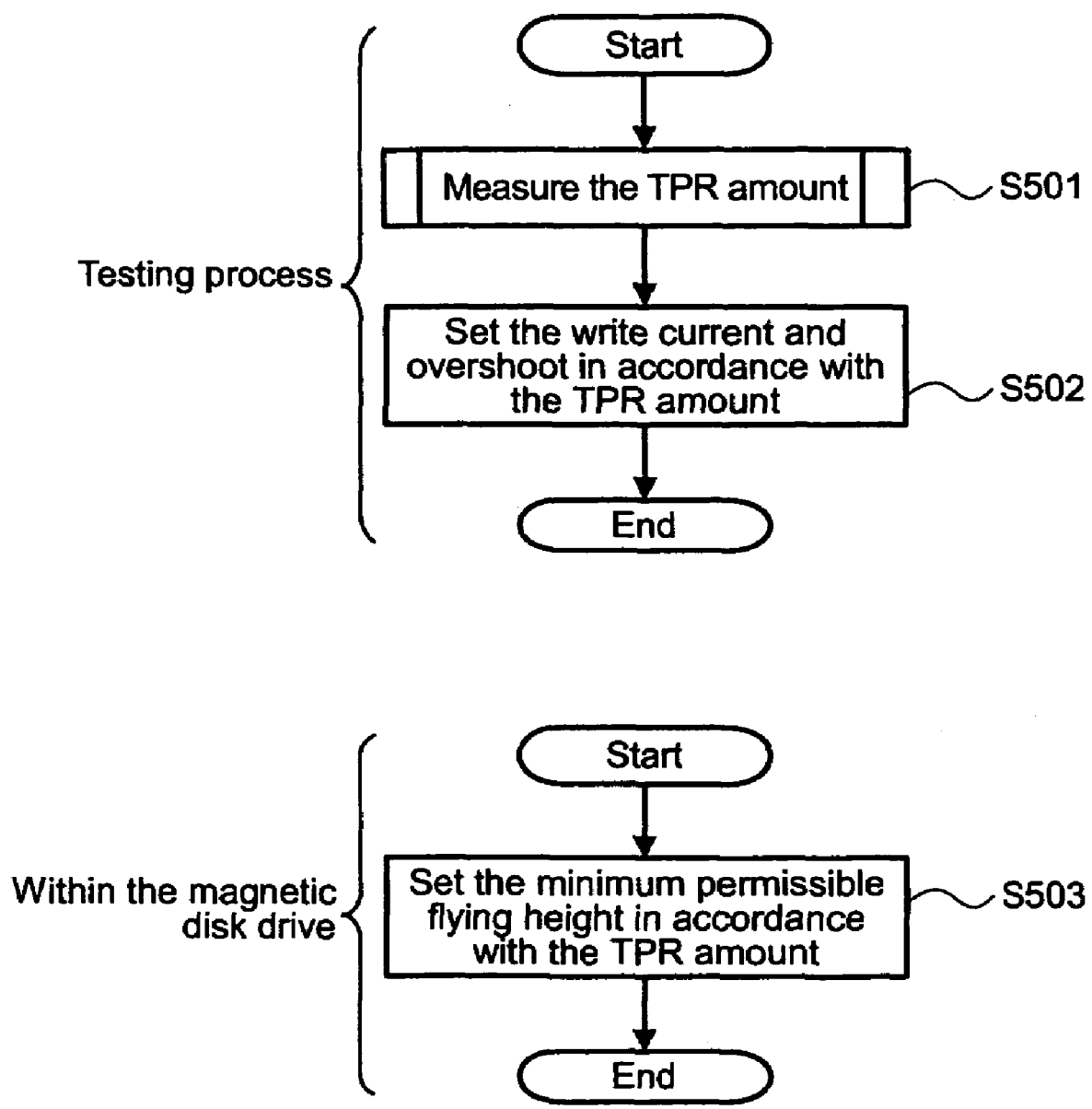
FIG. 5 shows flowcharts illustrating processing steps that are performed when a magnetic disk drive for actual use is inspected with a TPR measurement function in accordance with the second embodiment of the present invention.

A method for measuring the TPR amount during a testing process for a magnetic disk drive according to an embodiment of the present invention and a method for manufacturing the magnetic disk drive having a process for measuring the TPR amount will now be described with reference to a flowchart in FIG. 5. In a magnetic disk drive assembly process, the TPR is first measured within a magnetic disk, which is placed in a state for actual use (step S501). In this instance, the TPR amount measurement function may be provided for either the magnetic disk drive or the inspection device for use in a manufacturing process. The TPR amount measurement function can be implemented by the same functionality as described in conjunction with the first embodiment. The TPR amount data obtained by the TPR amount measurement function is stored in the memory or on the magnetic disk and used for flying height management. Further, a write current and the overshoot amount for the write current can be set in accordance with the obtained TPR amount (step S502).

The method for measuring the TPR amount within the magnetic disk can also be implemented by the same TPR amount measurement function as described in conjunction with the first embodiment (step S503). The TPR amount data about an outgoing magnetic disk drive can be measured/calculated and stored in the flash ROM 33 or on the magnetic disk 1.

When the TPR amount determined prior to magnetic disk drive shipment is used in conjunction with the flying height measurement made by the SMART function, flying height management can be performed with increased reliability within the magnetic disk drive. The determined TPR amount is recorded in the memory or on the magnetic disk and used for flying height management. The TPR amount varies with the magnetic head. It means that the TPR amount varies from one magnetic head to another, which are incorporated in the magnetic disk drive. When, for instance, a magnetic head having a great TPR amount is set to permit a fly greater than the minimum permissible flying height of a magnetic head having a small TPR amount, the possibility of magnetic head-to-magnetic disk contact can be reduced to provide increased reliability. When the TPR amounts appropriate for individual magnetic heads are used as described above to perform fly management while performing the SMART function as needed, it is possible to provide a high-reliability magnetic disk drive in which the loss of data and crash are not likely to occur due to magnetic head-to-magnetic disk contact.

Figure 6:
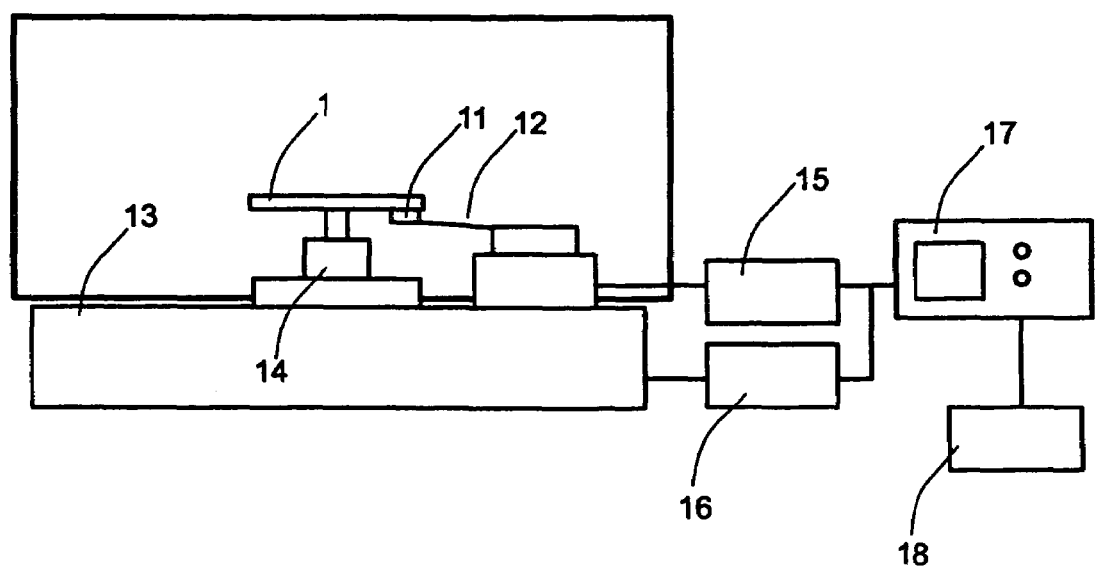
FIG. 6 is a schematic diagram that illustrates an-inspection device in accordance with the third embodiment of the present invention.

FIG. 6 is a schematic diagram illustrating an inspection device according to an embodiment of the present invention.

A magnetic disk 1 is fastened to a spindle 14 on a stage 13 to rotate. A magnetic head is mounted on an end of a slider 11, which is mounted on a suspension, and loaded over the magnetic disk 1. The output of a read head enters a spectrum analyzer 17 via a read/write analyzer 15, which comprises an amplifier and various circuits. A spectrum analyzer board, which functions the same as the spectrum analyzer, may be used alternatively. In addition, positional information enters the spectrum analyzer 17 in the same manner as described above. The measurement method will be described later. The spectrum analyzer is zero/span set so as to filter out only the frequency of a reference track 2 that is written on the magnetic disk 1. Further, the trigger signal needs to be adjusted so that the output of the reference track 2 can be read immediately after the end position A of a track that is written by an excitation signal. When setup is completed as described above, changes in the output of the reference track 2 can be captured with the spectrum analyzer immediately after a write-induced TPR is invoked by the excitation signal. The method for measuring the TPR amount can be implemented by the same function as the TPR amount measurement function, which is described in conjunction with the first embodiment, and a measurement algorithm that will be described with reference to FIG. 7. A control PC 18 has a TPR amount measurement function program according to the present embodiment.

Figure 7:
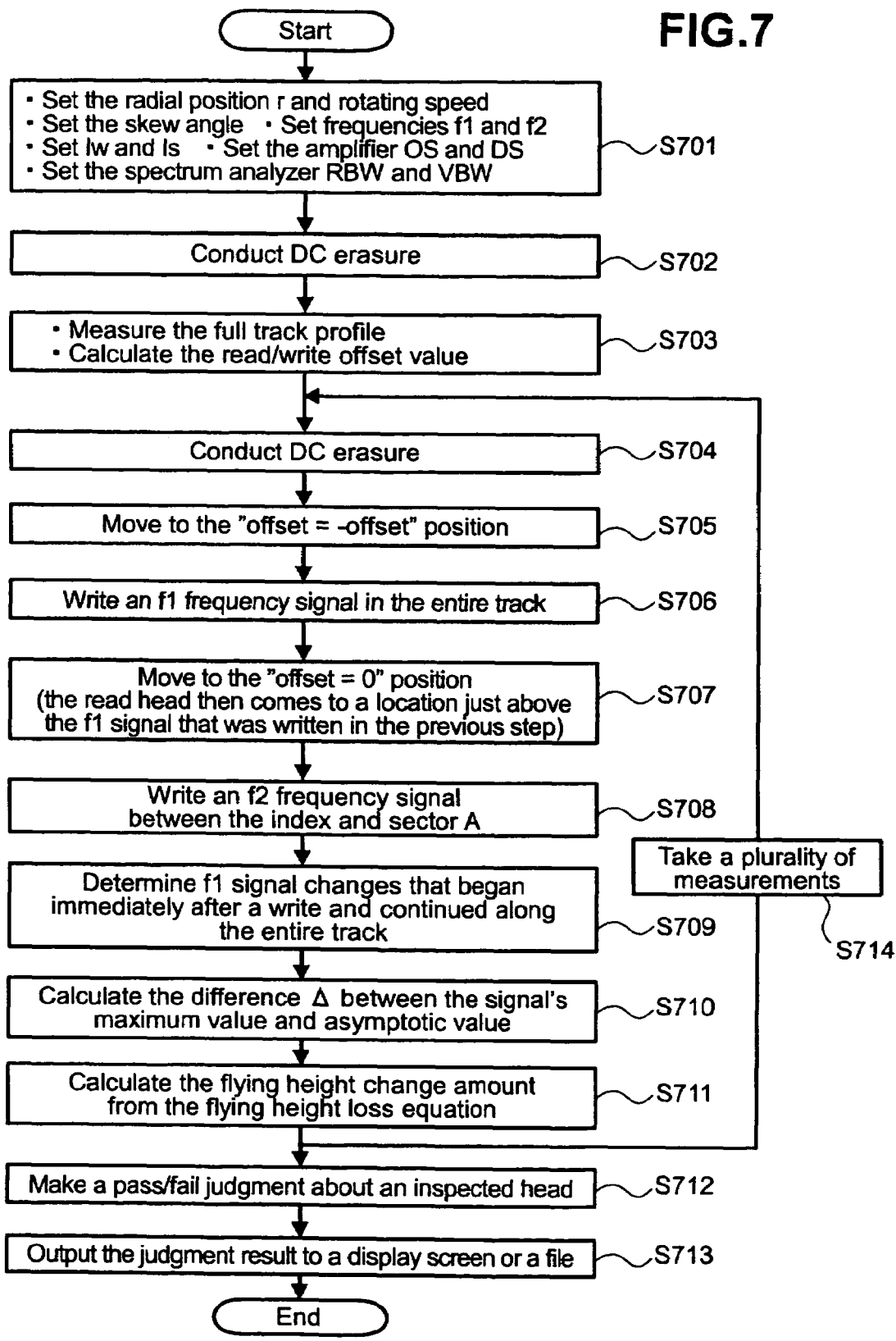
FIG. 7 is a flowchart illustrating TPR measurement processing steps that are performed in accordance with the third embodiment of the present invention.

FIG. 7 is a measurement flowchart. First of all, the radial position for loading a head over the magnetic disk, the rotating speed of the magnetic disk 1, frequency f1, frequency f2, write current Iw, sense current Is, write current overshoot (OS), overshoot duration time (DS), spectrum analyzer resolution bandwidth (RVB), and video bandwidth (VBW) are set (step S701). After completion of setup, the measurement area is subjected to DC erasure (steps S702 and S704) to completely erase the signal from the magnetic disk. If the magnetic head's read/write offset is unknown, the track profile is measured to determine the offset amount (step S703). The magnetic head is moved to a specified track (reference track 2) (step S705) to write an f1 signal in the entire track (step S706). After an adjustment is made to position the read head just above the f1 signal (on-track state) while considering the offset amount (step S707), an f2 signal is written over a specific length (step S708). The spectrum analyzer or the filter function of the spectrum analyzer is used immediately after the f2 signal write to capture f1 signal changes with time (step S709). The TPR amount is then calculated using the difference between the obtained output maximum value and asymptotic value (step S710) and the equation mentioned above (step S711). For measurement accuracy enhancement, a plurality of measurements may be taken (step S714). If, for instance, this function is used for magnetic head selection purposes, it is possible to make a pass/fail judgment after calculating the TPR amount (step S712) and output the judgment result to a display screen or a file (step S713).

As described above, the amount of write-induced TPR can be accurately measured with an inspection device having a TPR amount measurement function according to the present embodiment.

The TPR amount measurement function of the present invention provides flying height management and manufacturing control in accordance with TPR amount data about individual magnetic heads. It can be applied to a magnetic disk drive, a method for manufacturing a magnetic disk drive, and an inspection device for use in magnetic disk drive manufacture.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive, comprising: a memory or magnetic disk that stores thermal protrusion (TPR) amount information about each magnetic head used within said magnetic disk drive, the TPR amount information including information of an amount of protrusion of a flying surface of the magnetic head protruding toward the magnetic disk as a result of thermal expansion of the magnetic head; and a management module configured to perform magnetic head flying height management to manage a flying height of each magnetic head with respect to the magnetic disk in actual use based on the stored TPR amount information; wherein the TPR amount information stored in said memory or magnetic disk is previously measured during a test process for actual use for said magnetic disk drive, wherein the previously measured TPR amount information is obtained by capturing replay output changes of a first single frequency signal used to write a single pattern signal on a specific track or cylinder on the magnetic disk, and a second single frequency signal, wherein the second frequency signal is written on a portion of the specific track or cylinder written by the first single frequency signal.

2. The magnetic disk drive according to claim 1, further comprising a management mode module that adjusts the write current in accordance with the TPR amount or adjusts the write current overshoot amount.

3. The magnetic disk drive according to claim 1, wherein the management module comprises:
   a first flying height management module which uses said TPR amount information; and
   a second flying height management module, which provides stationary flying height management;
   wherein said first flying height management module and said second flying height management module are used to exercise magnetic head flying height management.

4. The magnetic disk drive according to claim 1, further comprising a management mode module that issues an alarm to a host computer or user, adjusts the write current, adjusts the write current overshoot amount, or unloads the head if the "specified flying height minus TPR amount" exceeds a predetermined threshold value.

5. A magnetic disk drive, comprising: a thermal protrusion (TPR) amount measurement module configured to measure magnetic head flying height changes caused by TPR within said magnetic disk drive, the TPR amount information including information of an amount of protrusion of a flying surface of a magnetic head protruding toward a magnetic disk as a result of thermal expansion of the magnetic head; and a management module configured to perform magnetic head flying height management with the TPR amount information about each magnetic head to manage a flying height of each magnetic head with respect to the magnetic disk in actual use, which is previously measured by the TPR amount measurement module; wherein the TPR amount information is stored in a memory or magnetic disk as previously measured during a test process for actual use for said magnetic disk drive, wherein the previously measured TPR amount information is obtained by capturing replay output changes of a first single frequency signal used to write a single pattern signal on a specific track or cylinder on the magnetic disk, and a second single frequency signal, wherein the second frequency signal is written on a portion of the specific track or cylinder written by the first single frequency signal.

6. The magnetic disk drive according to claim 5, wherein the management module comprises:
a first flying height management module which uses said TPR amount information; and
a second flying height management module, which provides stationary flying height management;
wherein said first flying height management module and said second flying height management module are used to exercise magnetic head flying height management.

7. The magnetic disk drive according to claim 5, wherein said TPR amount measurement module measures changes in the flying height upon magnetic disk drive turn-on, upon head loading, or at specific time intervals.

8. The magnetic disk drive according to claim 5, further comprising a management mode module that issues an alarm to a host computer or user, adjusts the write current, adjusts the write current overshoot amount, or unloads the head if the "specified flying height minus TPR amount" exceeds a predetermined threshold value.

9. A magnetic disk drive, comprising:
at least one magnetic disk on which a recording is made with a first single frequency signal in a specific track or cylinder on the magnetic disk; and
a thermal protrusion (TPR) amount measurement module configured to measure the amount of TPR about each magnetic head by replaying the first single frequency signal immediately after performing a write with a second single frequency signal in a part of the specific track or cylinder on the magnetic disk so as to continuously capture replay output changes of the first single frequency signal, the TPR amount information including information of an amount of protrusion of a flying surface of the magnetic head protruding toward the magnetic disk as a result of thermal expansion of the magnetic head,
wherein the TPR amount information is stored in a memory or the magnetic disk as previously measured during a test process for performing magnetic head flying height management to manage a flying height of the magnetic disk in actual use for said magnetic disk drive.

10. The magnetic disk drive according to claim 9, wherein the first single frequency signal is used to make a recording in a plurality of specific tracks or cylinders.

11. The magnetic disk drive according to claim 9, wherein the specific track or cylinder in which a recording is made with the first single frequency signal exists inside or outside a track or cylinder having an area in which a recording is made with the second single frequency signal.

12. The magnetic disk drive according to claim 9, wherein a time selected for replaying the first single frequency signal is longer than a time required for the replay output to be in equilibrium.

13. The magnetic disk drive according to claim 9, wherein a time selected for a write with the second single frequency signal is equal to or longer than a time required for the replay output of the first single frequency signal to be in equilibrium.

14. The magnetic disk drive according to claim 9, wherein said TPR amount measurement module measures changes in the flying height upon magnetic disk drive turn-on, upon head loading, or at specific time intervals.

15. The magnetic disk drive according to claim 9, further comprising a management mode module that issues an alarm to a host computer or user, adjusts the write current, adjusts the write current overshoot amount, or unloads the head if the "specified flying height minus TPR amount" exceeds a predetermined threshold value.

16. An inspection device, comprising:
a first write module configured to write a first single frequency signal in a specific area on a magnetic disk;
a second write module configured to write a second single frequency signal in a part of a specific area where the first single frequency signal is written;
a read module configured to read the previously written first single frequency signal immediately after a write operation is performed by the second write function to determine output changes; and
a calculation module configured to calculate a change in the flying height of a magnetic head with respect to the magnetic disk, which is a thermal protrusion (TPR) amount, from the output changes, based on a difference between a maximum value of the first single frequency signal read by the read module and a value of the first single frequency signal prevailing in equilibrium in which the TPR amount is approximately zero, the TPR amount information including information of an amount of protrusion of the flying surface of the magnetic head protruding toward the magnetic disk as a result of thermal expansion of the magnetic head.

17. The inspection device according to claim 16, further comprising a built-in spectrum analyzer board for measuring flying height changes or a module configured to measure an output by filtering out a specific frequency component with a spectrum analyzer.

18. A magnetic disk drive having at least one magnetic head, comprising: a storage unit for storing thermal protrusion (TPR) information about the at least one magnetic head used within said magnetic disk drive, the TPR amount information including information of an amount of protrusion of a flying surface of the magnetic head protruding toward a magnetic disk as a result of thermal expansion of the magnetic head, and a management module configured to perform magnetic head flying height management with the stored TPR information to manage a flying height of each magnetic head with respect to the magnetic disk in actual use; wherein the TPR amount information stored in said memory or magnetic disk is previously measured during a test process for actual use for said magnetic disk drive, wherein the previously measured TPR amount information is obtained by capturing replay output changes of a first single frequency signal used to write a single pattern signal on a specific track or cylinder on the magnetic disk, and a second single frequency signal, wherein the second frequency signal is written on a portion of the specific track or cylinder written by the first single frequency signal.

19. A method of using thermal protrusion (TPR) information of magnetic heads in a magnetic disk drive, comprising: storing thermal protrusion (TPR) information about the at least one magnetic head to be used within said magnetic disk drive, the TPR amount information including information of an amount of protrusion of a flying surface of the magnetic head protruding toward a magnetic disk as a result of thermal expansion of the magnetic head, and managing a flying height of said magnetic heads using said stored TPR information to manage a flying height of each magnetic head with respect to the magnetic disk in actual use; wherein the TPR amount information stored in said memory or magnetic disk is previously measured during a test process for actual use for said magnetic disk drive, wherein the previously measured TPR amount information is obtained by capturing replay output changes of a first single frequency signal used to write a single pattern signal on a specific track or cylinder on the magnetic disk, and a second single frequency signal, wherein the second frequency signal is written on a portion of the specific track or cylinder written by the first single frequency signal.

* * * * *